(12) United States Patent
Bouillet et al.

(10) Patent No.: US 8,490,049 B2
(45) Date of Patent: Jul. 16, 2013

(54) FACETED, TAG-BASED APPROACH FOR THE DESIGN AND COMPOSITION OF COMPONENTS AND APPLICATIONS IN COMPONENT-BASED SYSTEMS

(75) Inventors: Eric Bouillet, Englewood, NJ (US); Mark D. Feblowitz, Winchester, MA (US); Zhen Liu, Tarrytown, NJ (US); Anand Ranganathan, Stamford, CT (US); Anton V. Riabov, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 12/252,156

(22) Filed: Oct. 15, 2008

(65) Prior Publication Data

US 2010/0095269 A1   Apr. 15, 2010

(51) Int. Cl.
G06F 9/44 (2006.01)

(52) U.S. Cl.
USPC .................. 717/106; 717/101; 717/105

(58) Field of Classification Search
None
See application file for complete search history.

(56) References Cited

U.S. PATENT DOCUMENTS

| 4,821,211 | A | 4/1989 | Torres |
|---|---|---|---|
| 6,401,096 | B1 | 6/2002 | Zellweger |
| 7,334,216 | B2 | 2/2008 | Molina-Moreno et al. |
| 7,360,175 | B2 | 4/2008 | Gardner et al. |
| 7,502,799 | B2 | 3/2009 | Ohmori et al. |
| 7,548,917 | B2 | 6/2009 | Nelson |
| 7,600,188 | B2 | 10/2009 | Good et al. |
| 7,730,447 | B2 * | 6/2010 | Ringseth et al. ............. 717/106 |
| 7,792,836 | B2 * | 9/2010 | Taswell ........................ 707/737 |
| 7,793,268 | B2 * | 9/2010 | Wassel et al. ................. 717/130 |
| 7,802,230 | B1 | 9/2010 | Mendicino et al. |
| 7,908,584 | B2 * | 3/2011 | Singh et al. ................... 717/106 |
| 7,933,914 | B2 * | 4/2011 | Ramsey et al. ............... 707/760 |
| 8,161,036 | B2 | 4/2012 | Tankovich et al. |
| 8,175,936 | B2 | 5/2012 | Ronen et al. |
| 8,185,892 | B2 | 5/2012 | Lucas et al. |
| 8,225,282 | B1 * | 7/2012 | Massoudi et al. ............ 717/106 |
| 8,239,820 | B1 * | 8/2012 | White et al. .................. 717/101 |
| 8,327,351 | B2 * | 12/2012 | Paladino et al. ............. 717/106 |
| 2003/0058282 | A1 | 3/2003 | Sato |
| 2004/0059436 | A1 | 3/2004 | Anderson et al. |
| 2004/0254949 | A1 | 12/2004 | Amirthalingam |
| 2005/0108001 | A1 | 5/2005 | Aarskog |
| 2005/0166193 | A1 * | 7/2005 | Smith et al. ................... 717/143 |
| 2005/0203764 | A1 | 9/2005 | Sundararajan et al. |
| 2005/0204337 | A1 | 9/2005 | Diesel et al. |

(Continued)

OTHER PUBLICATIONS

Rajasekaran et al., "Enhancing Web Services Description and Discovery to Facilitate Composition", 2005, Springer-Verlag, SWSWPC 2004, LNCS 3387, pp. 55-68.*

(Continued)

Primary Examiner — Thuy Dao
Assistant Examiner — Ben C Wang
(74) Attorney, Agent, or Firm — F. Chau & Associates, LLC

(57) ABSTRACT

A method, including: receiving a software requirement; and constructing a workflow template that can satisfy the software requirement, wherein the workflow template comprises a plurality of processing stages, wherein each processing stage includes at least one component class and each component class includes at least one component, and wherein an output of each processing stage is described by a processing goal pattern that is described by a set of tags and facets.

16 Claims, 8 Drawing Sheets

U.S. PATENT DOCUMENTS

| | | | |
|---|---|---|---|
| 2005/0228855 A1* | 10/2005 | Kawato | 709/200 |
| 2006/0242101 A1* | 10/2006 | Akkiraju et al. | 707/1 |
| 2006/0248467 A1* | 11/2006 | Elvanoglu et al. | 715/744 |
| 2006/0271565 A1 | 11/2006 | Acevedo-Aviles et al. | |
| 2007/0011155 A1 | 1/2007 | Sarkar | |
| 2007/0033590 A1* | 2/2007 | Masuouka et al. | 718/100 |
| 2007/0061776 A1 | 3/2007 | Ryan et al. | |
| 2007/0073570 A1* | 3/2007 | Montagut | 705/8 |
| 2007/0174247 A1 | 7/2007 | Xu et al. | |
| 2007/0214111 A1* | 9/2007 | Jin et al. | 707/3 |
| 2008/0016072 A1 | 1/2008 | Frieden et al. | |
| 2008/0104032 A1 | 5/2008 | Sarkar | |
| 2008/0168420 A1* | 7/2008 | Sabbouh | 717/104 |
| 2008/0189675 A1* | 8/2008 | Aupperle et al. | 717/104 |
| 2008/0228851 A1* | 9/2008 | Angelov et al. | 709/201 |
| 2008/0229217 A1 | 9/2008 | Kembel et al. | |
| 2008/0229278 A1* | 9/2008 | Liu et al. | 717/106 |
| 2008/0313229 A1* | 12/2008 | Taswell | 707/104.1 |
| 2009/0037268 A1 | 2/2009 | Zaid et al. | |
| 2009/0077124 A1 | 3/2009 | Spivack et al. | |
| 2009/0094189 A1 | 4/2009 | Stephens | |
| 2009/0100407 A1* | 4/2009 | Bouillet et al. | 717/105 |
| 2009/0106080 A1 | 4/2009 | Carrier et al. | |
| 2009/0125977 A1* | 5/2009 | Chander et al. | 726/1 |
| 2009/0144296 A1 | 6/2009 | Agrawal et al. | |
| 2009/0150425 A1 | 6/2009 | Bedingfield, Sr. | |
| 2009/0171708 A1* | 7/2009 | Bobak et al. | 705/7 |
| 2009/0177955 A1* | 7/2009 | Liu et al. | 715/200 |
| 2009/0177957 A1* | 7/2009 | Bouillet et al. | 715/230 |
| 2009/0198668 A1 | 8/2009 | Jean Bolf et al. | |
| 2009/0198675 A1 | 8/2009 | Mihalik et al. | |
| 2009/0199158 A1 | 8/2009 | Bolf et al. | |
| 2009/0241015 A1 | 9/2009 | Bender et al. | |
| 2009/0249370 A1* | 10/2009 | Liu et al. | 719/330 |
| 2009/0276753 A1* | 11/2009 | Bouillet et al. | 717/105 |
| 2010/0077386 A1* | 3/2010 | Akkiraju et al. | 717/136 |
| 2010/0095267 A1* | 4/2010 | Bouillet et al. | 717/101 |
| 2010/0106546 A1* | 4/2010 | Sproule | 717/106 |
| 2010/0281458 A1* | 11/2010 | Paladino et al. | 717/106 |
| 2011/0107273 A1* | 5/2011 | Ranganathan et al. | 715/854 |
| 2011/0314439 A1* | 12/2011 | Colgrave et al. | 717/101 |

OTHER PUBLICATIONS

Battle et al., "Semantic Web Services Language (SWSL)", W3C Member Submission, Sep. 9, 2005, W3C, pp. 1-41; <http://www.w3.org/Submission/SWSF-SWSL/>.*

Liu et al., "A Planning Approach for Message-Oriented Semantic Web Service Composition", 2007, Association for the Advancement of Artificial Intelligence, pp. 1389-1394; <http://www.aaai.org/Papers/AAAI/2007/AAAI07-220.pdf>.*

Qiu et al., "Semantic Web Services Composition Using AI planning of Description Logics", 2006 IEEE, APSCC'06, pp. 1-8; <http://ieeexplore.ieee.org/xpl/mostRecentIssue.jsp?punumber=4041195>.*

Zhen Liu, "Zhen Liu—Nokia Research Center", pp. 1-5; downloaded Nov. 20, 2012; <research.nokia.com/people/zhen_liu>.*

Bouillet et al., "A Faceted Requirements-Driven Approach to Service Design and Composition", 2008 IEEE, pp. 369-376; <http://ieeexplore.ieee.org/stamp/stamp.jsp?tp=&arnumber=4670197>.*

Sohrabi et al., "Composition of Flow-Based Applications with HTN Planning", 2012, the 6th International Scheduling and Planning Applications woPKshop (SPARK), 2012, pp. 58-64; <http://www.aaai.org/ocs/index.php/WS/AAAIW12/paper/view/5303>.*

Bouillet et al., "MARIO: Middleware for Assembly and Deployment of Multi-platform Flow-Based Applications", ACM, 2009 Springer-Verlag, pp. 1-7; <http://dl.acm.org/results.cfm?h=1&source_query=&&cfid=265350054&cftoken=49979371>.*

The Amulet Environment: New Models for Effective User Interface Software Development, Myers, et al., IEEE Transactions on Software Engineering, vol. 23, No. 6, Jun. 1997.

Directed acyclic graph, Computing Dictionary, Dec. 7, 1994

D. Berardi, D. Calvanese, G.D. Giacomo, R. Hull, and M. Mecella, "Automatic composition of transition-based semantic web services with messaging", In VLDB, 2005.

F. Lecue and A. Leger, "A formal model for semantic web service composition", In ISWC '06, 2006.

S. Narayanan and S. McIlraith, "Simulation, verification and automated composition of web services", In WWW, 2002.

X.T. Nguyen, R. Kowalczyk, and M.T. Phan, "Modelling and solving QoS composition problem using Fuzzy DisCSP", In ICWS, 2006.

J. Pathak, S. Basu, and V. Honavar, "Modeling web services by iterative reformulation of functional and non-functional requirements", In ICSOC, 2006.

M. Pistore et al., "Automated synthesis of composite BPEL4WS web service", In ICWS, 2005.

R. Akkiraju et al., "Semaplan: Combining planning with semantic matching to achieve web service composition", In ICWS, 2006.

R. Berbner et al., "Heuristics for Q0S-aware web service composition", In ICWS, 2006.

A. Riabov and Z. Liu, "Planning for stream processing systems", In AAAI, 2005.

M. Sheshagiri, M. desJardins, and T. Finin, "A planner for composing services described in DAML-S", In Web Services and Agent-based Engineering—AAMAS, 2003.

K. Sivashanmugam, J. Miller, A. Sheth, and K. Verma, "Framework for semantic web process composition", Special Issue of the Interl Journal of Electronic Commerce, 2003.

Daniel H. Pink, "Folksonomy", The New York Times, Published: Dec. 11, 2005.

"Folksonomy" From Wikipedia, Oct. 5, 2007.

P. Traverso and M. Pistore, "Automated composition of semantic web services into executable processes", In ISWC'04.

Eric Bouillet, Mark Feblowitz, Hanhua Feng, Zhen Liu, Anand Ranganathan, Anton Riabov, "A Folksonomy-Based Model of Web Services for Discovery and Automatic Composition", In SCC, '08.

Eric Bouillet, Mark Feblowitz, Zhen Liu, Anand Ranganathan, Anton Riabov, "A Tag-Based Approach for the Design and Composition of Information Processing Applications", OOPSLA'08.

* cited by examiner

FACETED, TAG-BASED APPROACH FOR THE DESIGN AND COMPOSITION OF COMPONENTS AND APPLICATIONS IN COMPONENT-BASED SYSTEMS

GOVERNMENT INTERESTS

This invention was made with Government support under Contract No.: H98230-07-C-0383 awarded by the U.S. Department of Defense. The Government has certain rights in this invention.

RELATED APPLICATION

This application is related to commonly assigned U.S. application entitled "DESCRIBING FORMAL END-USER REQUIREMENTS IN INFORMATION PROCESSING SYSTEMS USING A FACETED, TAG-BASED MODEL", having Ser. No. 12/252,132, filed Oct. 15, 2008, the disclosure of which is incorporated by reference herein in its entirety.

BACKGROUND OF THE INVENTION

1. Technical Field

The present invention relates to service composition.

2. Discussion of the Related Art

The Web Services research community has proposed a number of approaches for service composition, ranging from manual to semi-automatic to completely automatic. However, it is often difficult to take independently developed services and compose them, since they may not work together correctly.

The conventional service-oriented architecture (SOA) lifecycle is essentially top-down, consisting of the four phases: Model, Assembly, Deploy and Manage. Modeling is the process of capturing the business design from an understanding of business requirements and objectives. Business requirements are translated into a specification of business processes, goals, and assumptions for creating a model of the business. During the Assemble phase, the IT organization takes the business design and assembles information system artifacts that implement the design. In this phase, existing artifacts and applications may be reused to meet the needs of the design, and new artifacts may be created as well. The Deploy and Manage phases include hosting the applications and monitoring the production runtime environment.

While the SOA lifecycle does emphasize flexibility and reuse, in practice, it is difficult to respond rapidly to changing user requirements and processing needs. Typically, new user requirements are again addressed top-down by going through the four stages. However, it may be possible to address some new user requirements by assembling new workflows from available services in a bottom-up fashion. For this to happen, however, the services should modeled and developed keeping in mind the needs of spontaneous composition.

There are a number of challenges in combining the top-down and bottom-up approaches to service engineering. Firstly, the requirements should be captured appropriately, at the right level of abstraction and formality. Next, one should ensure that an appropriate set of services are developed, which can be combined into workflows that satisfy the requirements. Another challenge is in enabling a high degree of reuse of both individual services and of workflows in different contexts and in different application domains. Finally, there should be mechanisms for end-users to have appropriate workflows rapidly assembled for them in response to their processing needs.

Accordingly, there is a need for services to be designed and developed in a manner that facilitates their composition.

SUMMARY OF THE INVENTION

In an exemplary embodiment of the present invention, a method, comprises: receiving a software requirement; and constructing a workflow template that can satisfy the software requirement, wherein the workflow template comprises a plurality of processing stages, wherein each processing stage includes at least one component class and each component class includes at least one component, and wherein an output of each processing stage is described by a processing goal pattern that is described by a set of tags and facets.

An input and an output of a component class are each described by a variable processing goal pattern that includes tags, facets and variables, and an input and an output of a component in the component class are each described by a set of tags and variables.

The method further comprises, prior to constructing the workflow template, representing the software requirement as a plurality of goal instances in a requirements goal pattern, wherein the requirements goal pattern is described by a set of tags and facets.

The method further comprises, after constructing the workflow template, for each goal instance, developing at least one workflow instance that can satisfy the goal instance, wherein the workflow instance follows or belongs to the workflow template.

A workflow instance is a directed acyclic graph and comprises at least one of the components arranged in a processing graph to produce information that satisfies the goal instance.

A tag is a keyword associated with an available resource.

A facet is a category that includes at least one tag.

A variable is associated with a set of tags, and wherein a variable is bound to a tag if the tag is a sub-tag of all tags in the set of tags.

In an exemplary embodiment of the present invention, a method, comprises: receiving a high-level software requirement; representing the high-level software requirement as a plurality of processing goals described by a requirements goal pattern, wherein the requirements goal pattern is described by a set of tags and facets; constructing a workflow template that can produce information to satisfy the high-level software requirement, wherein the workflow template comprises a plurality of processing stages, wherein each processing stage includes at least one component class and each component class includes at least one component, and wherein an output of each processing stage is described by a processing goal pattern that is described by a set of tags and facets; and for each of the plurality of processing goals, developing at least one workflow instance that can satisfy the processing goal, wherein the workflow instance follows or belongs to the workflow template, and wherein a workflow instance is a directed acyclic graph and comprises at least one of the components arranged in a processing graph to produce information that satisfies the goal instance.

The method further comprises: receiving at least one of the plurality of processing goals from a user, wherein the user processing goal includes at least one tag; producing information that satisfies the user processing goal by executing one of the workflow instances that belongs to the workflow template or by generating and executing a new workflow instance that does not belong to the workflow template; and providing the information to the user.

In an exemplary embodiment of the present invention, a computer readable storage medium stores instructions that, when executed by a computer, cause the computer to perform a method, the method comprising: receiving a software requirement; and constructing a workflow template that can satisfy the software requirement, wherein the workflow template comprises a plurality of processing stages, wherein each processing stage includes at least one component class and each component class includes at least one component, and wherein an output of each processing stage is described by a processing goal pattern that is described by a set of tags and facets.

An input and an output of a component class are each described by a variable processing goal pattern that includes tags, facets and variables, and an input and an output of a component in the component class are each described by a set of tags and variables.

The method further comprises, prior to constructing the workflow template, representing the software requirement as a plurality of goal instances in a requirements goal pattern, wherein the requirements goal pattern is described by a set of tags and facets.

The method further comprises, after constructing the workflow template, for each goal instance, developing at least one workflow instance that can satisfy the goal instance, wherein the workflow instance follows or belongs to the workflow template.

A workflow instance is a directed acyclic graph and comprises at least one of the components arranged in a processing graph to produce information that satisfies the goal instance.

A tag is a keyword associated with an available resource.

A facet is a category that includes at least one tag.

A variable is associated with a set of tags, and wherein a variable is bound to a tag if the tag is a sub-tag of all tags in the set of tags.

In an exemplary embodiment of the present invention, a computer readable storage medium stores instructions that, when executed by a computer, cause the computer to perform a method, the method comprising: receiving a high-level software requirement; representing the high-level software requirement as a plurality of processing goals described by a requirements goal pattern, wherein the requirements goal pattern is described by a set of tags and facets; constructing a workflow template that can produce information to satisfy the high-level software requirement, wherein the workflow template comprises a plurality of processing stages, wherein each processing stage includes at least one component class and each component class includes at least one component, and wherein an output of each processing stage is described by a processing goal pattern that is described by a set of tags and facets; and for each of the plurality of processing goals, developing at least one workflow instance that can satisfy the processing goal, wherein the workflow instance follows or belongs to the workflow template, and wherein a workflow instance is a directed acyclic graph and comprises at least one of the components arranged in a processing graph to produce information that satisfies the goal instance.

The method further comprises: receiving at least one of the plurality of processing goals from a user, wherein the user processing goal includes at least one tag; producing information that satisfies the user processing goal by executing one of the workflow instances that belongs to the workflow template or by generating and executing a new workflow instance that does not belong to the workflow template; and providing the information to the user.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
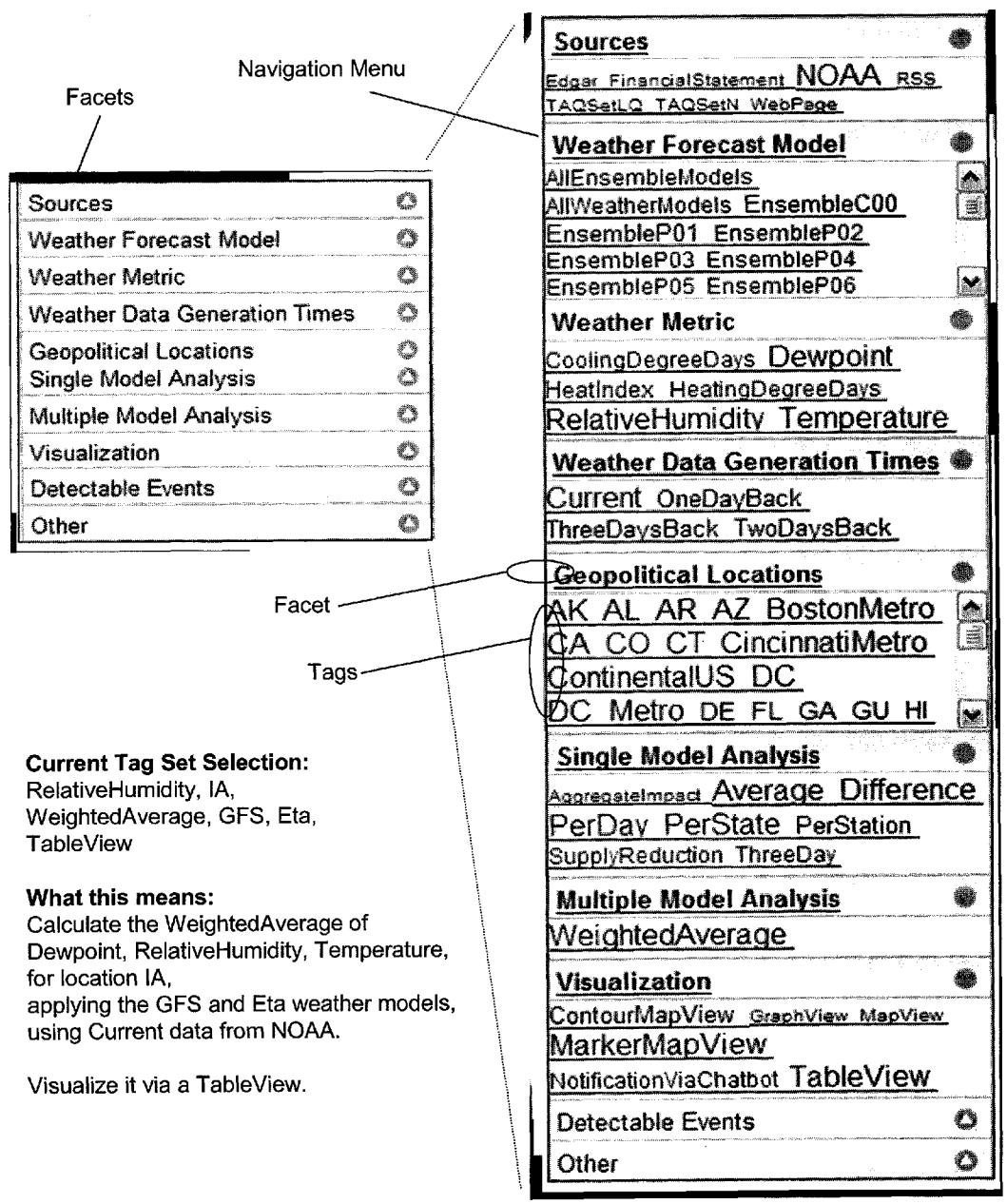
FIG. 1 shows a faceted navigation menu and a user-selected, tag-based goal, according to an exemplary embodiment of the present invention.

This disclosure incorporates by reference herein in its entirety, Bouillet et al. A tag-based approach for the design and composition of information processing applications. Object-Oriented Programming, Systems, Languages and Applications (OOPSLA) '08, to be published Oct. 19-23, 2008.

In this disclosure, we provide a novel methodology for designing, developing and composing services that incorporate both top-down and bottom-up elements. In an exemplary embodiment, the methodology is driven by faceted, tag-based functional requirements that are elicited from end-users. The facets represent different dimensions of both data and processing, where each facet is modeled as a finite set of tags that are defined in a controlled folksonomy. The faceted, tag-based functional requirements are the starting point of a top-down lifecycle where workflows and individual services are designed, explicitly keeping in mind the needs of the composition. The requirements are taken by enterprise architects who design workflow templates that are also associated with faceted, tag-based descriptions. These workflow templates can either reuse existing services or workflows, or they can be used to generate new service requirements, which are also described in terms of facets and tags. These new services are then developed by the developers, and are tested individually and in conjunction with other services as per the workflow templates.

When an end-user submits a processing goal, also expressed in terms of facets and tags, a workflow can be composed, either automatically or manually, using the developed services. Our system uses an AI planner for the automatic composition of workflows using the goal specification from the end-user and the tag-based descriptions of different individual services. During the automatic or manual composition of workflows based on end-user processing goals, new workflows that were not explicitly designed earlier by the enterprise architect may also be created. Hence, different services can be composed in a bottom-up fashion to create new workflows that satisfy new processing goals.

A notable aspect of this methodology is the pervasive use of faceted, tag-based descriptions of functional requirements, of service capabilities, of structural workflow templates and of end-user processing goals. These faceted, tag-based descriptions guide the overall workflow design and the service development lifecycle.

In this disclosure, we focus on information processing workflows, which are workflows that retrieve and process information as desired by end-users. However, exemplary embodiments of the present invention are not limited thereto. These workflows make available unified information, obtained or extracted from multiple data sources, in response to end-users' information inquiries. Examples of such workflows are those that obtain business intelligence for analysts and those that perform information integration and content management. The key drivers for these workflows are to facilitate better decision making by end-users and better information sharing between business operations.

In [E. Bouillet et al. A folksonomy-based model of web services for discovery and automatic composition. In IEEE Services Computing Conference (SCC), 2008)], the disclosure of which is incorporated by reference herein in its entirety, we introduced the use of tag-based descriptions for describing individual services. In the present disclosure, we expand on this model to facilitate the design and development of services that are composable. Some contributions of our methodology are:

1. A faceted, tag-based model for describing high-level end-user information processing requirements.
2. A service design and development lifecycle that results in the development of services that can be composed into workflows satisfying the end-user requirements.
3. An approach for the bottom-up composition of workflows in response to dynamic end-user processing goals.

Mixing Top-Down Structure with Bottom-Up Serendipity in Service Engineering

Developing services that can be composed together into diverse workflows requires a holistic service engineering methodology, where the services are developed keeping in mind the needs of the composition. A purely bottom-up service engineering process, where we attempt to compose services that are developed independently, generally does not succeed in practice, since these services are not likely to work correctly when composed. In addition, a purely top-down approach where a workflow (or a set of workflows) are designed in advance, and services are developed to fit into these workflows, is often not flexible enough to deal with new situations and new processing goals that require different workflows. Hence, a combination of top-down design with bottom-up reuse can achieve correct composition that can work in different situations.

As mentioned above, in this disclosure, we focus on information processing workflows that extract data from one or more sources, process them after using one or more services, and produce useful information or knowledge. The key end-users of information processing workflows are analysts and decision makers in various enterprises. These end-users need to quickly obtain and update the business intelligence that guides their decision. For this, they need to collect the needed information from a potentially huge number of diverse sources, adapt and integrate that data, and apply a variety of analytic models, updating the results as the data changes. When new sources are discovered and/or new analytic models are developed—or simply when new ways of applying existing models are desired—users of information systems cannot and should not wait the days or months needed for development cycles to complete, to get the analysis results they urgently need. These users require the serendipitous assembly of new workflows from the available services to satisfy their dynamic and changing information processing goals.

Pervasive Use of Tags

Our methodology combines top-down structure with bottom-up serendipity through the pervasive use of faceted, tag-based descriptions. In this methodology, we use tags, associated with organizing facets, to describe:
functional requirements elicited from end-users
all data, and messages exchanged between services
high-level workflow templates that describe the structure of families of related workflows
individual services
workflow instances
dynamic end-user information processing goals
Tags and Tag Hierarchies The word "tag" comes from various collaborative tagging applications that have arisen in Web 2.0 (such as del.icio.us and Flickr) where users annotate different kinds of resources (like bookmarks and images) with tags. These tags aid search and retrieval of resources. A key aspect of the tagging model is that it is relatively simple, in comparison to more expressive models such as those based on Semantic Web ontologies and other formal logics. Hence, it offers a lower barrier to entry for different kinds of users to describe resources. In our case, the resources are different kinds of data artifacts, like files, input and output messages to services, etc.

Let $T=\{t_1, t_2, \ldots, t_k\}$ be the set of tags in our system. In most social tagging applications, the set of tags, T, is completely unstructured, i.e., there is no relation between individual tags. Introducing a hierarchy structure in T, however, enhances the expressivity by allowing additional tags to be inferred for resources. A tag hierarchy, H, is a directed acyclic graph (DAG) where the vertices are the tags, and the edges represent "sub-tag" relationships. It is defined as H=(T,S), where T is the set of tags and $S \subseteq T \times T$ is the set of sub-tag relationships. If a tag $t_1 \in T$ is a sub-tag of $t_2 \in T$, denoted $t_1 \prec t_2$, then all resources annotated by $t_1$ can also be annotated by $t_2$. For convenience, we assume that $\forall t \in T, t \prec t$.

Facets

Facets represent dimensions for characterizing resources (data artifacts). Let $F=\{f_i\}$ be the set of facets. Each facet is a set of tags, i.e., $f_i \subseteq T$. Tags may be shared across facets.

FIG. 1 shows an example of a faceted tag cloud interface for the weather and energy trading services domain. In this domain, end-users can specify different kinds of weather forecast processing goals. Some of the facets are Sources, Weather Forecast Model, Weather Metric, etc. Each facet includes a number of tags, e.g., the Weather Metric facet includes tags like Dewpoint, Temperature, etc. It is noted that some tags are larger, indicating that they are relevant to a larger number of user-specifiable goals. End-users can select one or more tags to formulate the processing goal; our interface also provides a natural language interpretation of the goal from the set of tags, to provide feedback to the end-user on how the system interprets the goal.

Dynamic End-User Processing Goals Expressed Using Tags

As shown in FIG. 1, end-user processing goals are specified as a set of tags. For example, a commodities broker might want to watch for predicted extremes in relative humidity that might indicate a drought, indicating an opportunity to trade corn futures. He would express this as the goal Global Forecast System (GFS), Eta, RelativeHumidity, IA, WeightedAverage, ContourMapView, which represents a request for a workflow that delivers the weighted average of two relative humidity forecasts (produced using the GFS and Eta forecast models obtained from NOAA—the National Oceanographic and Atmosphere Association) for the state of Iowa presented on a contour map.

Each data artifact in our system, a is characterized by a set of tags $d(a) \subseteq T$. The data artifacts include the input and output messages of web services, RSS feeds, web pages, files, etc. The tags only describe the semantics of the data artifacts, and not the actual syntax.

End-user goals describe the semantics of the desired data artifacts that may be produced by an information processing workflow. A goal, $q \subseteq T$, is satisfied by a data artifact, a, iff $\forall t \in q \exists t' \in d(a), t' \prec t$.

Figure 2:
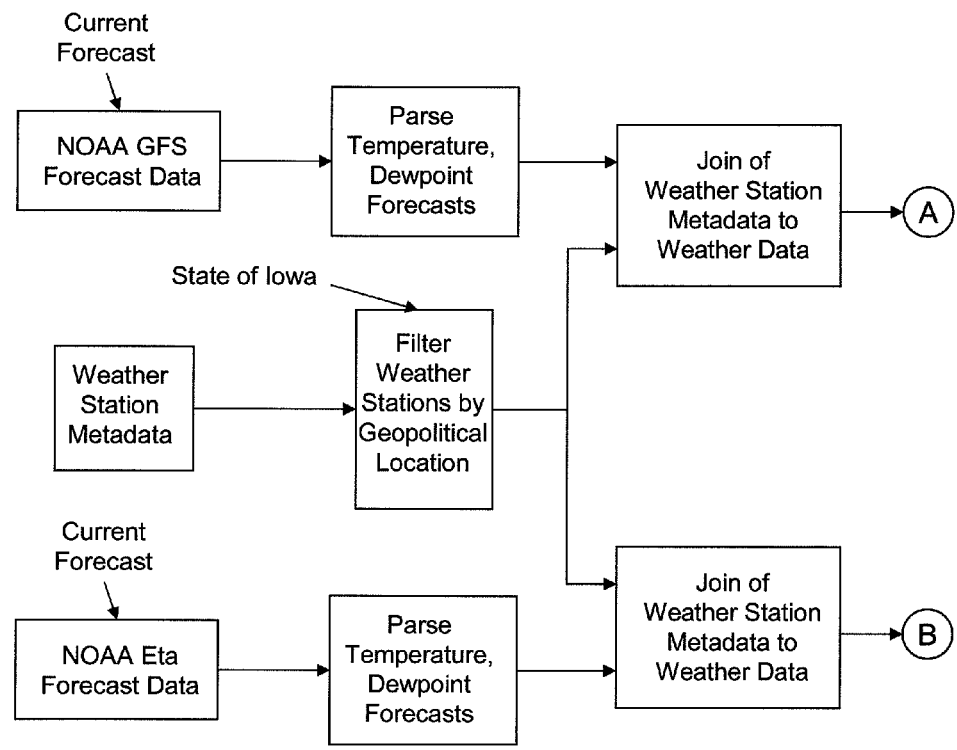
FIG. 2 shows a flow for a user-selected tag-based goal, according to an exemplary embodiment of the present invention.
Figure 2:
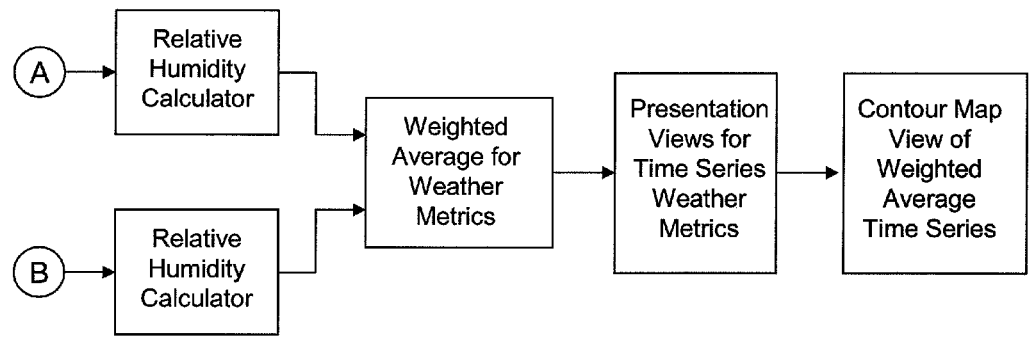

When a user selects a goal, a workflow is composed in a bottom-up manner from the available services. In our system, this bottom-up composition occurs through an AI planner, such as, for example, the planner described in [A. Riabov and Z. Liu. Planning for stream processing systems. In American Association for Artificial Intelligence (AAAI), 2005], the disclosure of which is incorporated by reference herein in its entirety, that uses tag-based descriptions of individual services to come up with a workflow satisfying the goal. FIG. 2 shows an example of such as workflow. For example, FIG. 2 is a flow example for the "IA RelativeHumidity GFS Eta WeightedAverage ContourMapView" goal. The final Contour Map View service in the workflow is a REST service that end-user can access for real-time result information. Some services like NOAA GFS Forecast Data are instantiated with specific configuration parameters like Current Forecast. In other words, the boxes in FIG. 2 represent components of an application.

We model a workflow as a graph G (V,E) where G is a DAG (Directed Acyclic Graph). Each vertex $v \in V$ is a service instance. Each edge (u,v) represents a logical flow of messages from u to v. If a vertex, v has multiple incoming edges of the form $(u_1, v), (u_2, v), \ldots$, then it means that the output message produced by $u_1, u_2, \ldots$ are used together to create an input message to v. The message corresponding to each edge, (u,v), can be described by a set of tags, d((u,v)). In this disclosure, we restrict the workflows to acyclic graphs since capturing the semantics of messages where there are loops is difficult. However, exemplary embodiments of the present invention are not limited thereto.

Overview of Lifecycle

For a flow, such as the one in FIG. 2 to be assembled, the individual services are designed, described and developed appropriately. For this purpose, we provide a service engineering lifecycle (see FIG. 3) that is driven by high-level faceted, tag-based functional requirements. In information processing systems, the functional requirements describe the general kinds of information the end-user desires. In our approach, these functional requirements are expressed as patterns of goals that the user would like to submit. Note that this disclosure focuses on functional requirements and not non-functional requirements like security, performance and cost. However, the exemplary embodiments of the present invention are applicable to both sets of requirements.

The functional requirements are taken by an enterprise architect who comes up with a high-level design of the overall workflow(s) and of individual services. The architect first constructs one or more workflow templates that satisfy the requirements. A workflow template is a high-level description of the flow structure and is modeled as a graph of processing stages, where each stage performs a certain segment of the overall required information processing. Each stage in turn consists of a graph of service classes, where a service class is an equivalence class of services that share similar properties and are substitutable in certain contexts. The modular and substitutable nature of services enable such composition. In addition, the decomposition of the workflow into processing stages allows reuse of both services and entire sub-flows.

Figure 3:
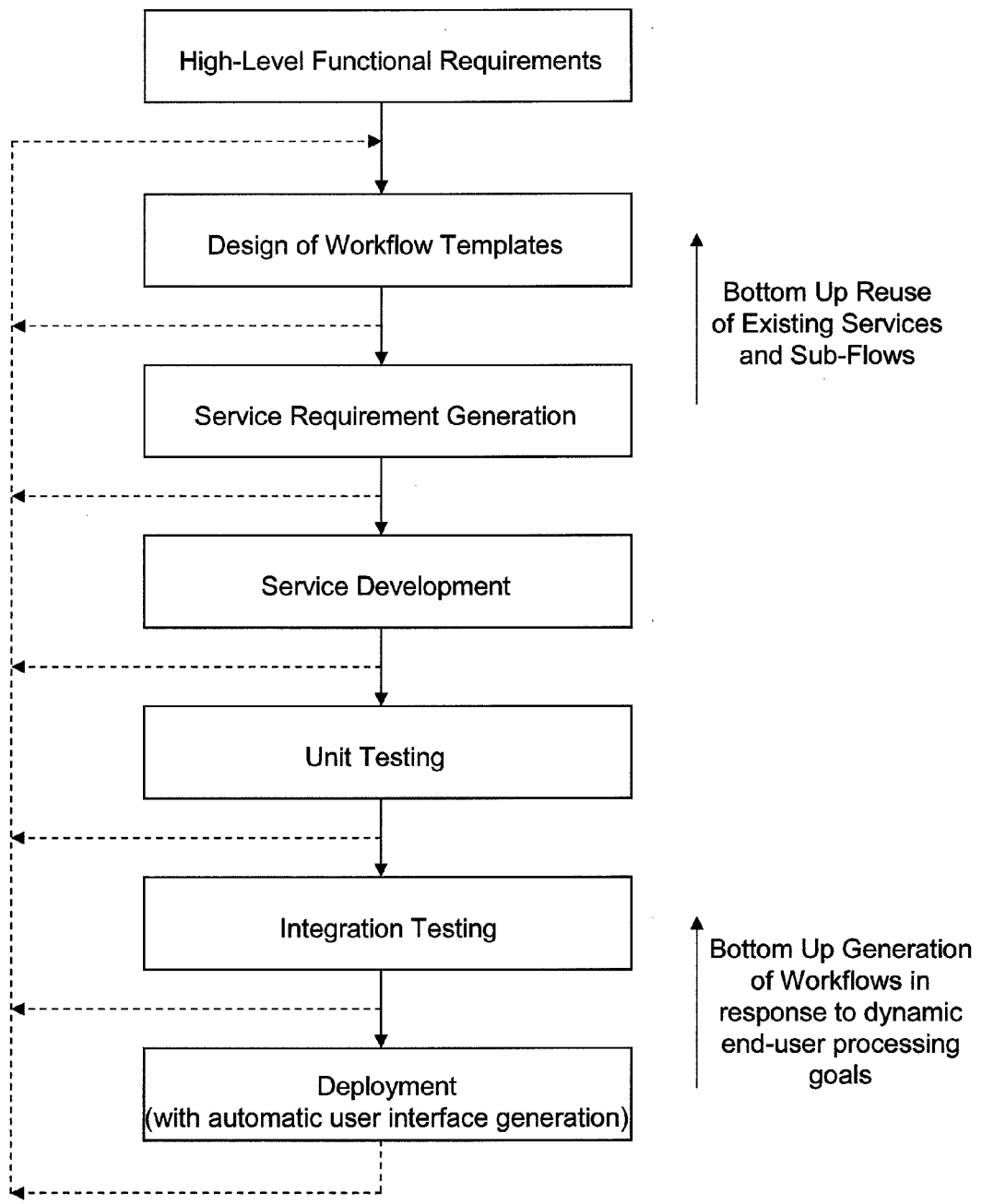
FIG. 3 shows a service development lifecycle, according to, an exemplary embodiment of the present invention.

The architect can reuse existing services (and service classes) in designing the workflow. In some cases, new services may need to be developed, or existing services modified, to satisfy new end-user requirements. The architect defines the semantic requirements of the new services in terms of tags describing the input and output data. In addition, the architect defines the syntactic interfaces (e.g., using WSDL) to enable its interaction with other services in the processing stage, and in the workflow, in general. These semantic and syntactic service requirements are passed to a developer, who develops the service and tests it both individually and in conjunction with other services. Finally, the new services are made available for composition and deployment. This may also result in changes to the end-user interface to include the new tags describing the outputs of workflows that contain the new service. Finally, as shown in FIG. 3, the different stages of the lifecycle are iterative, and proceed in a spiral refinement manner to finally converge towards the required system.

Although the methodology as presented has a top-down emphasis, it does support the bottom-up construction of flows. First, in the workflow template construction stage, it is possible to reuse existing services or sub-flows in defining the template. Second, after deployment, our composition approach is not constrained by the pre-defined workflow templates. Instead, the planner can construct new flows to satisfy user goals using the available services. The planner is not aware of the workflow templates; instead, it creates flows anew from the goal specification. This allows for the spontaneous generation of new flows from existing services that were not necessarily designed by the architect.

In summary, some aspects of our approach are:
1. The top-down approach guarantees that the services developed can be composed to create workflows that meet the initial end-user requirements.
2. The tag-based descriptions of all services facilitates their recombination in new ways to create new workflows that satisfy new end-user goals, which may or may not have been part of the initial requirements.
3. The common, yet extensible, facets and tag hierarchies establish a simple, shared vocabulary that is used by architects, developers and end-users.
4. End-user requirements are captured in a formal manner. This enables us to verify that the requirements are actually satisfied by a set of composable services.

Faceted, Tag-Based Requirements for Driving Composition

Workflow composition requires careful design of the services. The first need is to make sure that at least those flows are composed that meet certain business requirements, which are explicitly specified by the end-users. In addition, if they satisfy new requirements through serendipitous composition of services, that is a bonus.

Hence, in our approach, high-level end-user requirements drive the service engineering process. In any large-scale information processing system, there may be a large number of different kinds of information, and a large number of different ways of processing this information. Hence, requirements are not specified in terms of single goals but as whole classes of goals that are described by goal patterns.

A goal pattern is described as a set of tags and facets. Each facet is associated with a cardinality constraint. The cardinality constraint specifies how many tags in the facet should be part of the goal.

We first define the set of cardinality constraints, CC, as the set of all ranges of positive integers. Then a goal pattern, QP=$\{(x,c)|x\in F, c\in CC\}\cup\{t|t\in T\}$. A goal pattern requirement means that end-users are interested in all data artifacts that can be described by a combination of tags that are drawn from the facets in the goal pattern, according to the cardinality constraints.

An example of a goal pattern is {Source[$\geq$1], WeatherForecastModel[$\geq$2], MultipleModelAnalysis[1], BasicWeatherMetric[$\geq$1], Visualization[1]}.

This represents the class of all data artifacts that can be used to describe one or more tags that belong to the Source facet, two or more tags in the WeatherForecastModel facet, one tag in the MultipleModelAnalysis facet, one tag in the BasicWeatherMetric facet, and one tag in the Visualization facet.

A point to note is that the goal pattern can refer to a large number of possible goals. For example, if there are five tags in the Source facet, 50 tags in the Model facet, five in the MultipleModelAnalysis facet, 10 in the BasicWeatherMetric facet, and 10 in the Visualization facet, there are up to $2^5 \times 2^{50} \times 5 \times 2^{10} \times 10$ possible kinds of data that may be producible by the information processing system. The goal pattern helps in succinctly expressing the combinatorial number of possible goals that can be submitted to the system.

Workflow Templates

An architect takes a requirement, in the form of a goal pattern and constructs one or more workflow templates that can satisfy all the goal instances belonging to the goal pattern. A workflow template is a high-level description of the workflow structure, consisting of abstract processing stages and services. Each goal instance belonging to the goal pattern can be satisfied by a workflow instance that follows the workflow template.

The workflow templates are intended to guide the goal answering process. It is important to note that they are not the only solutions, though. It is possible to assemble a different flow, that is not part of the template, and that uses potentially different services to satisfy the same goal.

Figure 4:
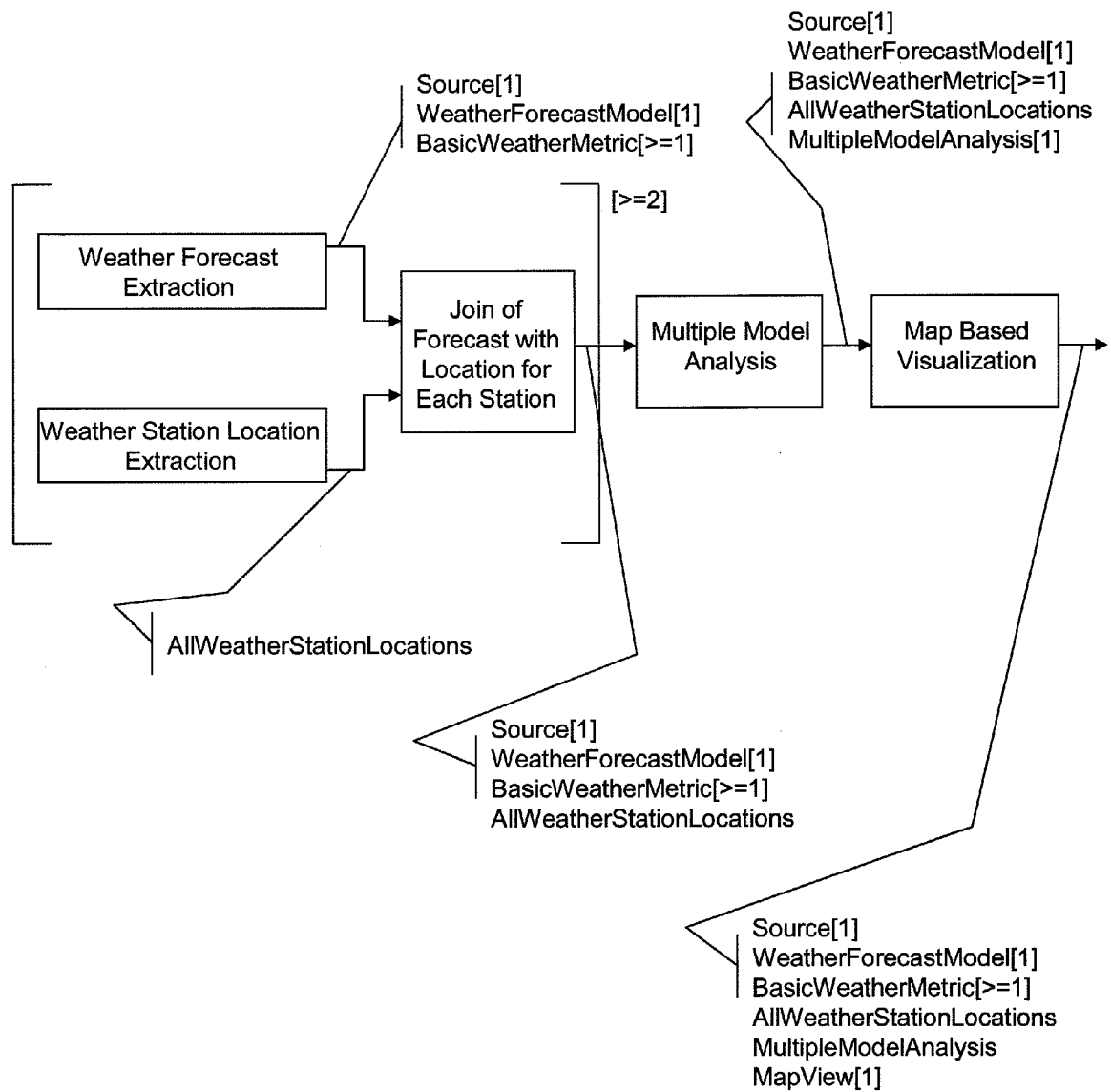
FIG. 4 shows a workflow template with different processing stages, according to an exemplary embodiment of the present invention.

A workflow template is a directed acyclic graph, where the vertices are processing stages and edges represent transfer of messages between services in the different stages. FIG. 4 shows an example of a workflow template, with FIG. 2 being one example instantiation of the template. Each processing stage, itself, can be described by a directed acyclic graph, where the vertices are service classes and edges represent the transfer of messages between different service classes. Each processing stage in the template is associated with a goal pattern that it can satisfy.

Formally, a workflow template is defined as a directed acyclic graph $\mathcal{G}$ (V, $\epsilon$, p, $\lambda$) where V $\subseteq$ S and $\epsilon \subseteq$ V$\times$V. S is the set of all processing stages. The function p associates subgraphs (or sub-flows) with a parallelism constraint, p:g$\rightarrow$CC, where g is a subgraph of $\mathcal{G}$ In the example above, one of the subgraphs is associated with a constraint that at least two instances of the processing stages in the subgraph run in parallel. By default, a sub-graph is associated with a cardinality of one.

Each processing stage is associated with a goal pattern that describes the kinds of goals that the sub-flow formed by this processing stage and all preceding processing stages in the flow, can answer. $\lambda$ is a function that associates a processing stage with the goal pattern it produces as output. $\lambda: v \rightarrow \mathcal{GP}$, where $\mathcal{GP}$ is the set of all possible goal patterns.

Processing Stage

A processing stage is a directed acyclic graph $S(V_S, E_S)$ where S is a DAG (Directed Acyclic Graph). Each vertex $v \in V_S$ is a service class (defined later). Each edge $(u.v) \in E_S$ represents a logical flow of messages from a service in the class u to a service in the class v. Each stage can in fact be viewed as a high-level service with input requirements and output capabilities.

Figure 5:
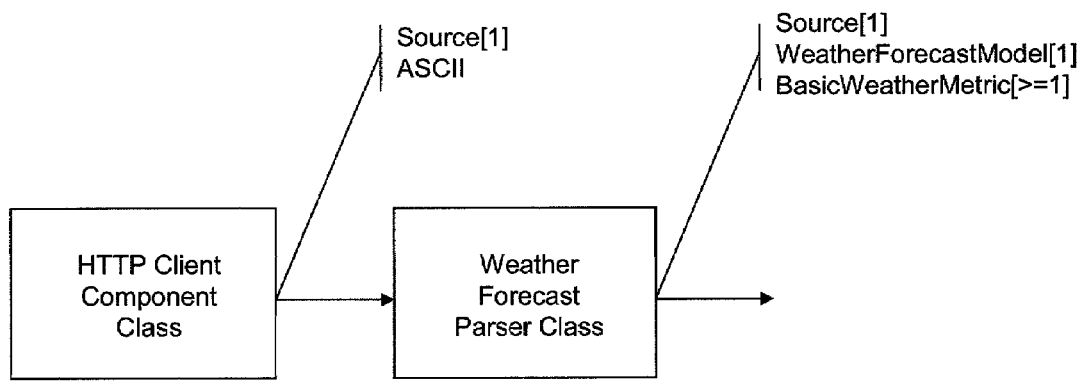
FIG. 5 shows a processing stage for weather forecast extraction, according to an exemplary embodiment of the present invention.

An example of a stage is shown in FIG. 5. It consists of two services, the first fetches a file given a Uniform Resource Locator (URL), and the second parses a weather forecast.

Figure 6:
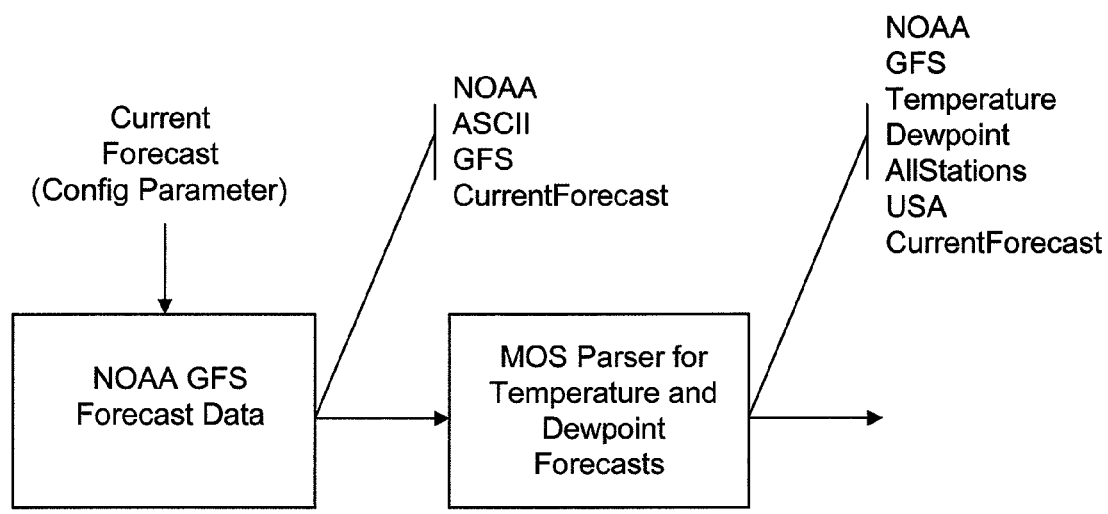
FIG. 6 shows an instantiation of a weather forecast extraction processing stage, according to an exemplary embodiment of the present invention.

FIG. 6 shows a concrete instance of the processing stage, where the service classes have been instantiated with specific services. The first service class is instantiated with a service that fetches NOAA GFS forecasts and is configured to fetch the current forecast. The second service class is instantiated with a service called MOSParser that parses Model Output Statistics (MOS) forecasts from NOAA to extract temperature and dewpoint predictions for stations in the U.S. MOS is a class of forecasts that includes GFS and Eta.

Service Class and Service Requirements

Services that perform similar tasks and have similar input constraints can be grouped together into a class. For example, all services that take a set of weather forecasts from different sources and aggregate them in some fashion (e.g., performing an average, or coming up with a probability distribution, or finding the minimum or maximum or clustering or detecting outliers) may be grouped together into a class.

The key intuition behind a service class is that all the members of a service class are substitutable in a certain context. That is, in any given flow, a service can be replaced by another service in the same class without any syntactic or semantic mismatch. Hence, the definition of a service class is specific to a certain flow (or a certain class of flows).

This notion of substitutability of services enables our approach to automated composition. Our composition approach starts with a high-level workflow template definition that is made up of a flow of substitutable services. Different substitutions of services result in different instances of the templates that can satisfy specific goals.

Let C={c} be the set of all services in the system. Then the set of all service classes is $\mathbf{C} \subseteq 2^C$. In addition, a service class, is $\mathbf{C} \subseteq 2^C$. In addition, a service class, X$\in$C, is specific to a certain position in a flow, or set of flows. If a$\in$X appears in this position, then it can be substituted by any b$\in$X.

Service classes are defined in terms of their inputs and outputs, which are defined using variable goal patterns. A variable, v, is a member of the set V where V is infinite and disjoint from T. A variable is represented with a preceding "?". Each variable is associated with one or more types (which are also tags). Let $\tau: V \rightarrow T$ be a function that maps a variable to a set of types. A variable, v can be bound to a tag, t if the tag is a sub-tag of all the types of the variable, i.e., canbind(v,t) iff $\forall x \in \tau(v), t \prec x$.

The inputs and outputs of a service class, X, can be described by goal patterns that include variables. We define the set of all variable goal patterns as VQP=$\{(x,c)|x\in F\cup V, c\in CC\}\cup\{t|t\in T\cup V\}$. Then a service class, X, can be defined as the pair $(I_X, O_X)$.

$I_X$ is a variable goal pattern that describes a class of input message constraints.
2. $O_X$ is a variable goal pattern that describes a class of output message constraints.
3. The set of variables in $O_X$ is a subset of the set of variables $I_X$. This constraint ensures that no free variables exist in the output description.

Figure 7:
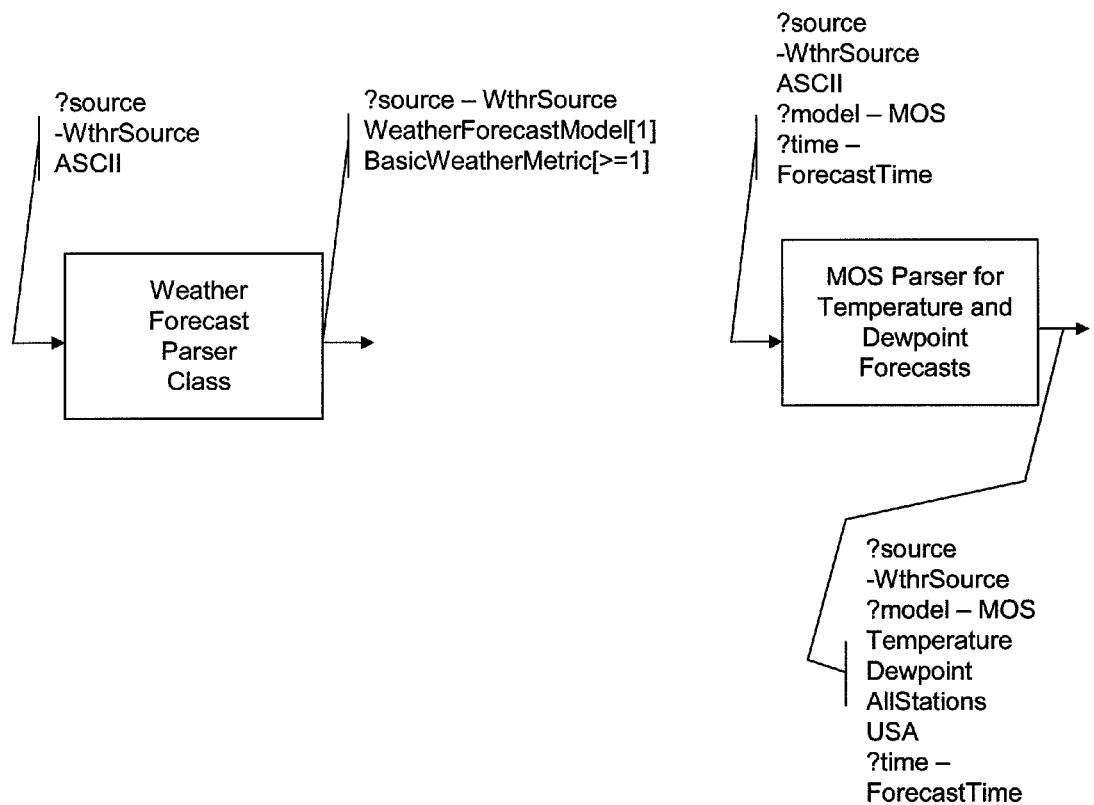
FIG. 7 shows a service class and a service, according to an exemplary embodiment of the present invention.

We assume that each service belongs to a trivial service class, which is a singleton set. FIG. 7 shows an example service class on the left. The input and output descriptions include the variable ?source whose type is WthrSource. This means that both the input and output include the same tag, which is a sub-tag of WthrSource, such as NOAA.

Service Model

A service class can also act as a requirement specification for a new service, or a set of services. This brings us to the model for describing a single service (or a service operation). Services are described in terms of input and output message constraints that include variables and tags. The variables help in propagating semantic information from the input to the output, since whatever value the variable is bound to in the input of a service is propagated to the output. FIG. 7 shows an example of service on the right that parses MOS forecasts from NOAA.

Let C be the set of all services in the system. A service, $o \in C$, is defined as the pair $(I_o, O_o)$ where:
1. $I_o \subseteq (T \cup V)$ is an input message constraint.
2. $O_o \subseteq (T \cup V)$ is an output message constraint.
3. The set of variables in $O_o$, is a subset of the set of variables in $I_o$.

Note that some services (and service classes) may have no input message constraints, which means that they produce outputs without requiring any input message (e.g., periodically or in response to an event). Our model also includes other information such as binding (i.e., how exactly to instantiate or invoke a service) and other documentation on the service. Further details are available in [E. Bouillet et al. A folksonomy-based model of web services for discovery and automatic composition. In SCC, 2008].

A part of composing workflows is determining whether a message, produced by some service, can be given as input to another service. In a valid workflow, all messages sent as input to a web service must satisfy both the syntactic and semantic input constraints of the service. The syntactic constraints are based on the interface description (e.g., in WSDL). The semantic constraints are based on the tag descriptions of a message and the input descriptions of the web service. The semantics of a message, a, can be described by the set of tags, d(a). We define that d(a) matches an input constraint, $I_o$ (denoted by $d(a) \sqsubseteq I_o$, iff:
1. For each tag in $I_o$, there exists a sub-tag that appears in d(a).
   Formally, $\forall y \in (I_o \cap V), (\exists x \in d(a), x \prec y)$.
2. For each variable in $I_o$, there exists a tag in d(a) to which the variable can be bound. Formally,
   $\forall y \in (I_o \cap V), (\exists x \in d(a), canbind(y,x))$.

Bottom-Up, Goal-Driven Workflow Composition

Once new services are developed and tested, they can be used in new workflows. The problem of goal-driven composition can be described as constructing workflows that produce a message satisfying the goal. Given a composition problem P(T, C, g), where T is a tag taxonomy, C is a set of services, and $g \subseteq T$ is a composition goal, the set of solutions is all valid workflows, $\mathcal{G}$, such that for each workflow graph $G(V,E) \in \mathcal{G}$, the message corresponding to at least one edge in E must satisfy the goal.

Our system includes an AI planner, such as, for example, the planner described in [A. Riabov and Z. Liu. Planning for stream processing systems. In AAAI, 2005] that composes workflows from the available services given the goal. The planner is used in the serendipitous assembly of new workflows. It is not aware of the workflow templates; hence, it can compose flows that follow the templates and also possibly new flows, which do not fall into any of the explicitly designed templates.

As an example, assume that there is a service developed in a different context that took weather data and stored it as tables in a database. Then this service can potentially replace any of the visualization services deployed as part of the workflow template in FIG. 4. Hence, a dynamic user goal such as GFS, Eta, RelativeHumidity, IA, WeightedAverage, DatabaseStorage may be satisfiable even though it was not part of the original user requirements.

In this disclosure, we described the use of faceted, tag-based descriptions as a means of specifying high-level end-user requirements. The requirements kick off a top-down service development lifecycle, where enterprise architects and service developers design abstract workflow templates, generate requirements for new services, develop and test the new services and workflows, and finally make available the services for manual or automatic composition in response to dynamic user goals. At different stages of this lifecycle, it is possible to reuse individual services or compose flows in different contexts, and also compose new flows in response to user requests in a serendipitous, bottom-up manner.

We have used our service design and development methodology in a financial services deployment that included a total of 135 services. The development and annotation of the services was undertaken by a team of five people, including one person serving as a requirements engineer and application architect. Some of the services ran on IBM's Project Zero platform, which allows the development of REST-based services, while other were components in IBM's System S stream processing system. The workflow sizes ranged from five to 150 services. Preliminary experiences have shown the usefulness of our approach for developing composable services.

Figure 8:
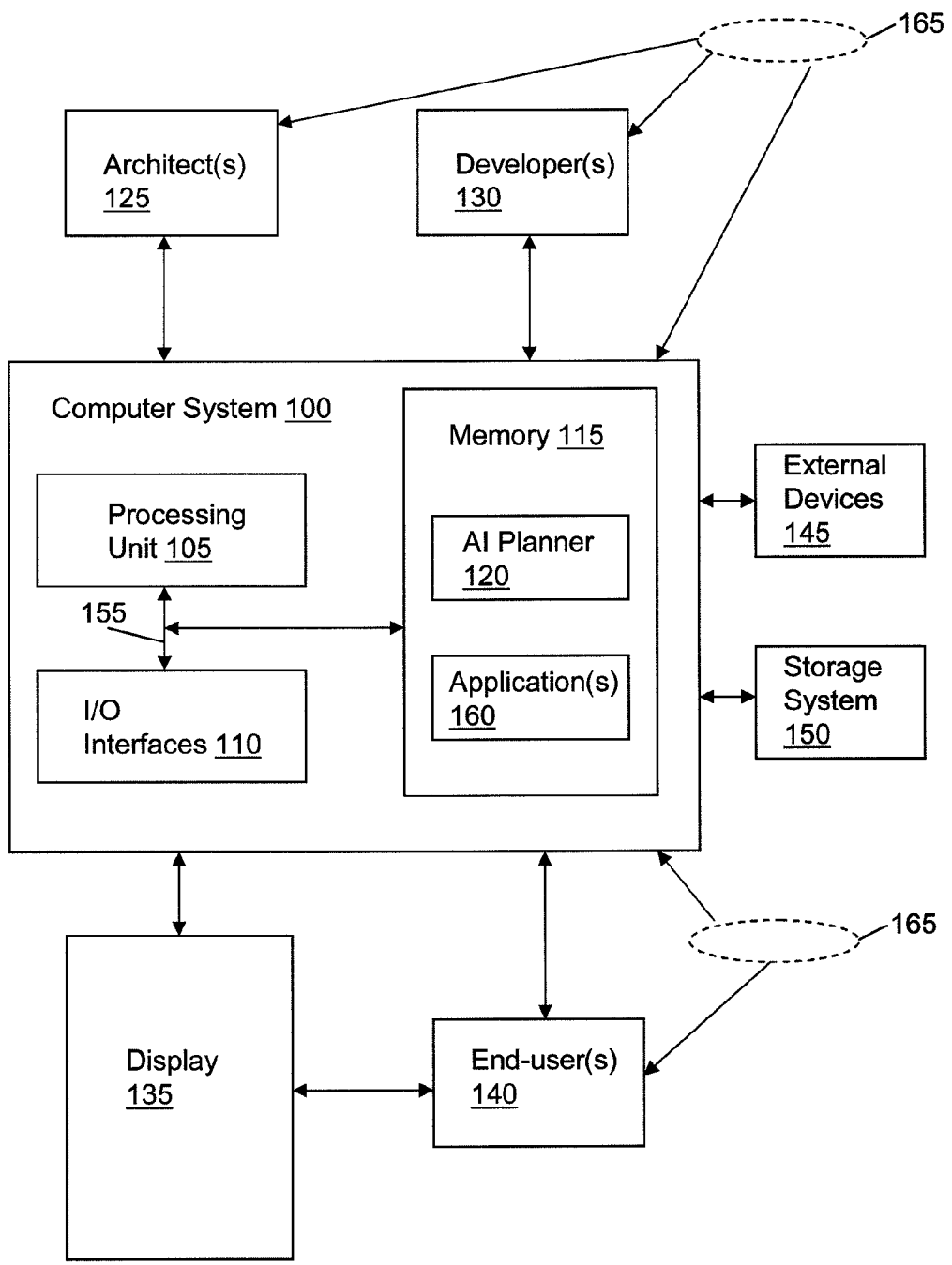
FIG. 8 shows a block diagram of a system in which exemplary embodiments of the present invention may be implemented.

A system in which exemplary embodiments of the present invention may be implemented is shown in FIG. 8. As shown in FIG. 8 the system includes a computer system 100, which can represent any type of computer system capable of carrying out the teachings of the present invention. For example, the computer system 100 can be a laptop computer, a desktop computer, a workstation, a hand-held device, a server, a cluster of computers, etc. End-user(s) 140, architect(s) 125, or developer(s) 130 can access the computer system 100 directly, or can operate a computer system that communicates with computer system 100 over a network 165 (e.g., the Internet, a wide area network (WAN), a local area network (LAN), a virtual private network (VPN), etc.).

Computer system 100 is shown including a processing unit 105, a memory 115, a bus 155, and input/output (I/O) interfaces 110. Further, computer system 100 is shown in communication with external devices/resources 145 and one or more storage system 150. In general, processing unit 105 executes computer program code, such as AI planner 120 or an application 160, that is stored in memory 115 and/or storage system 150. While executing computer program code, processing unit 105 can read and/or write data, to/from memory 115, storage system 150, and/or I/O interfaces 110. Bus 155 provides a communications link between each of the components in computer system 100. External devices/resources 145 can comprise any devices (e.g., keyboard, pointing device, display (e.g., display 135, printer, etc.) that enable a user to interact with computer system 100 and/or any devices (e.g., network card, modem, etc.) that enable computer system 100 to communicate with one or more other computing devices.

Storage system 150 can be any type of system (e.g., database) that is capable of providing storage information for use with exemplary embodiments of the present invention. Such information can include, workflow templates, services and service classes, semantic and syntactic requirements, test results, etc. Shown in memory 115 (e.g., as a computer program product) is the AI planner 120, which is used to develop workflows consisting of components configured to satisfy a user goal, and one or more application(s) 160, which represent the developed workflows, that can be executed by the end-user(s) 140, for example. The application(s) 160 can also be stored in the storage system 150.

It should be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, Random Access Memory (RAM), Compact Disk (CD) Read Only Memory (ROM), Digital Video Disk (DVD), ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A computer-implemented method, comprising:
receiving a software requirement; and
constructing a workflow template that can satisfy the software requirement, wherein the workflow template comprises a plurality of processing stages, wherein each processing stage includes at least one component class and each component class includes at least one component, and wherein an output of each processing stage is described by a processing goal pattern that is described by a set of tags and facets,
wherein each facet is associated with a cardinality constraint that specifies how many tags in the facet are part of the goal,
wherein the processing goal pattern is represented as a semantic description of a first facet and a first numerical value indicating how many tags in the first facet are part of a first processing goal and a semantic description of a second facet and a second numerical value indicating how many tags in the second facet are part of a second processing goal, the method further comprising:
prior to constructing the workflow template, representing the software requirement as a plurality of goal instances in a requirements goal pattern;
after constructing the workflow template, for each goal instance, developing at least one workflow instance that can satisfy the goal instance, wherein the workflow instance follows or belongs to the workflow template,
wherein a workflow instance is a directed acyclic graph and comprises at least one of the components arranged in a processing graph to produce information that satisfies the goal instance.

2. The method of claim 1, wherein an input and an output of a component class are each described by a variable processing goal pattern that includes tags, facets and variables, and an input and an output of a component in the component class are each described by a set of tags and variables.

3. The method of claim 2,
wherein the requirements goal pattern is described by a set of tags and facets.

4. The method of claim 1, wherein a tag is a keyword associated with an available resource.

5. The method of claim 1, wherein a facet is a category that includes at least one tag.

6. The method of claim 1, wherein a variable is associated with a set of tags, and wherein a variable is bound to a tag if the tag is a sub-tag of all tags in the set of tags.

7. A computer-implemented method, comprising:
receiving a high-level software requirement;
representing the high-level software requirement as a plurality of processing goals described by a requirements goal pattern, wherein the requirements goal pattern is described by a set of tags and facets, wherein each facet is associated with a cardinality constraint that specifies how many tags in the facet are part of the goal, wherein the requirements goal pattern is represented as a semantic description of a first facet and a first numerical value indicating how many tags in the first facet are part of a first processing goal and a semantic description of a second facet and a second numerical value indicating how many tags in the second facet are part of a second processing goal;
constructing a workflow template that can produce information to satisfy the high-level software requirement, wherein the workflow template comprises a plurality of processing stages, wherein each processing stage includes at least one component class and each component class includes at least one component, and wherein an output of each processing stage is described by a processing goal pattern that is described by a set of tags and facets; and
for each of the plurality of processing goals, developing at least one workflow instance that can satisfy the processing goal, wherein the workflow instance follows or belongs to the workflow template, and
wherein a workflow instance is a directed acyclic graph and comprises at least one of the components arranged in a processing graph to produce information that satisfies the goal instance.

8. The method of claim 7, further comprising:
receiving at least one of the plurality of processing goals from a user, wherein the user processing goal includes at least one tag;

producing information that satisfies the user processing goal by executing one of the workflow instances that belongs to the workflow template or by generating and executing a new workflow instance that does not belong to the workflow template; and providing the information to the user.

9. A computer readable storage memory storing instructions that, when executed by a computer, cause the computer to perform a method, the method comprising:

receiving a software requirement; and constructing a workflow template that can satisfy the software requirement, wherein the workflow template comprises a plurality of processing stages, wherein each processing stage includes at least one component class and each component class includes at least one component, and wherein an output of each processing stage is described by a processing goal pattern that is described by a set of tags and facets, wherein each facet is associated with a cardinality constraint that specifies how many tags in the facet are part of the goal, wherein the processing goal pattern is represented as a semantic description of a first facet and a first numerical value indicating how many tags in the first facet are part of a first processing goal and a semantic description of a second facet and a second numerical value indicating how many tags in the second facet are part of a second processing goal, the method further comprising:

prior to constructing the workflow template, representing the software requirement as a plurality of goal instances in a requirements goal pattern;

after constructing the workflow template, for each goal instance, developing at least one workflow instance that can satisfy the goal instance, wherein the workflow instance follows or belongs to the workflow template, wherein a workflow instance is a directed acyclic graph and comprises at least one of the components arranged in a processing graph to produce information that satisfies the goal instance.

10. The computer readable storage memory of claim 9, wherein an input and an output of a component class are each described by a variable processing goal pattern that includes tags, facets and variables, and an input and an output of a component in the component class are each described by a set of tags and variables.

11. The computer readable storage memory of claim 10, wherein the requirements goal pattern is described by a set of tags and facets.

12. The computer readable storage memory of claim 9, wherein a tag is a keyword associated with an available resource.

13. The computer readable storage memory of claim 9, wherein a facet is a category that includes at least one tag.

14. The computer readable storage memory of claim 9, wherein a variable is associated with a set of tags, and wherein a variable is bound to a tag if the tag is a sub-tag of all tags in the set of tags.

15. A computer readable storage memory storing instructions that, when executed by a computer, cause the computer to perform a method, the method comprising:

receiving a high-level software requirement; representing the high-level software requirement as a plurality of processing goals described by a requirements goal pattern, wherein the requirements goal pattern is described by a set of tags and facets, wherein each facet is associated with a cardinality constraint that specifies how many tags in the facet are part of the goal, wherein the requirements goal pattern is represented as a semantic description of a first facet and a first numerical value indicating how many tags in the first facet are part of a first processing goal and a semantic description of a second facet and a second numerical value indicating how many tags in the second facet are part of a second processing goal;

constructing a workflow template that can produce information to satisfy the high-level software requirement, wherein the workflow template comprises a plurality of processing stages, wherein each processing stage includes at least one component class and each component class includes at least one component, and wherein an output of each processing stage is described by a processing goal pattern that is described by a set of tags and facets; and for each of the plurality of processing goals, developing at least one workflow instance that can satisfy the processing goal, wherein the workflow instance follows or belongs to the workflow template, and wherein a workflow instance is a directed acyclic graph and comprises at least one of the components arranged in a processing graph to produce information that satisfies the goal instance.

16. The computer readable storage memory of claim 15, the method further comprising:

receiving at least one of the plurality of processing goals from a user, wherein the user processing goal includes at least one tag;

producing information that satisfies the user processing goal by executing one of the workflow instances that belongs to the workflow template or by generating and executing a new workflow instance that does not belong to the workflow template; and providing the information to the user.

* * * * *